(12) United States Patent
Suzuki et al.

(10) Patent No.: US 12,518,792 B2
(45) Date of Patent: Jan. 6, 2026

(54) MAGNETIC DISK DEVICE AND METHOD OF CONTROLLING THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Sho Suzuki, Tokyo (JP); Takeyori Hara, Kawasaki Kanagawa (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 0 days.

(21) Appl. No.: 18/883,964

(22) Filed: Sep. 12, 2024

(65) Prior Publication Data
US 2025/0292798 A1 Sep. 18, 2025

(51) Int. Cl.
*G11B 21/21* (2006.01)
*G11B 5/48* (2006.01)

(52) U.S. Cl.
CPC ............ *G11B 21/21* (2013.01); *G11B 5/4886* (2013.01)

(58) Field of Classification Search
CPC ......... G11B 33/08; G11B 21/08; G11B 5/012; G11B 5/02; G11B 20/10046; G11B 20/10; G11B 27/36; G11B 5/04; G11B 20/10013; G11B 5/5962; G11B 20/18; G11B 5/59655

USPC ........................................................... 360/75
See application file for complete search history.

(56) References Cited

U.S. PATENT DOCUMENTS

| 6,982,848 | B2 * | 1/2006 | Inaji | ................. G11B 5/5582 |
| | | | | 360/77.02 |
| 7,570,445 | B2 | 8/2009 | Alfred et al. | |
| 10,217,485 | B1 | 2/2019 | Iwashiro | |
| 10,553,248 | B1 | 2/2020 | Iwashiro | |
| 2019/0066727 | A1 | 2/2019 | Iwashiro | |

FOREIGN PATENT DOCUMENTS

| JP | H01-43379 B2 | 9/1989 |
| JP | 2019-40657 A | 3/2019 |
| JP | 2020-47333 A | 3/2020 |

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic disk device includes an actuator which holds a magnetic head to move in a radial direction of a magnetic disk with voice coil motor drive, and a controller. The controller moves a magnetic head from a current position to a target position by controlling the voice coil motor drive. The controller calculates an acceleration of the magnetic head, based on a position history of the magnetic head, and calculates an acceleration of the magnetic head, based on a value of a drive current of the voice coil motor. The controller detects vibration occurring in the actuator, based on a difference between the calculated accelerations.

20 Claims, 12 Drawing Sheets

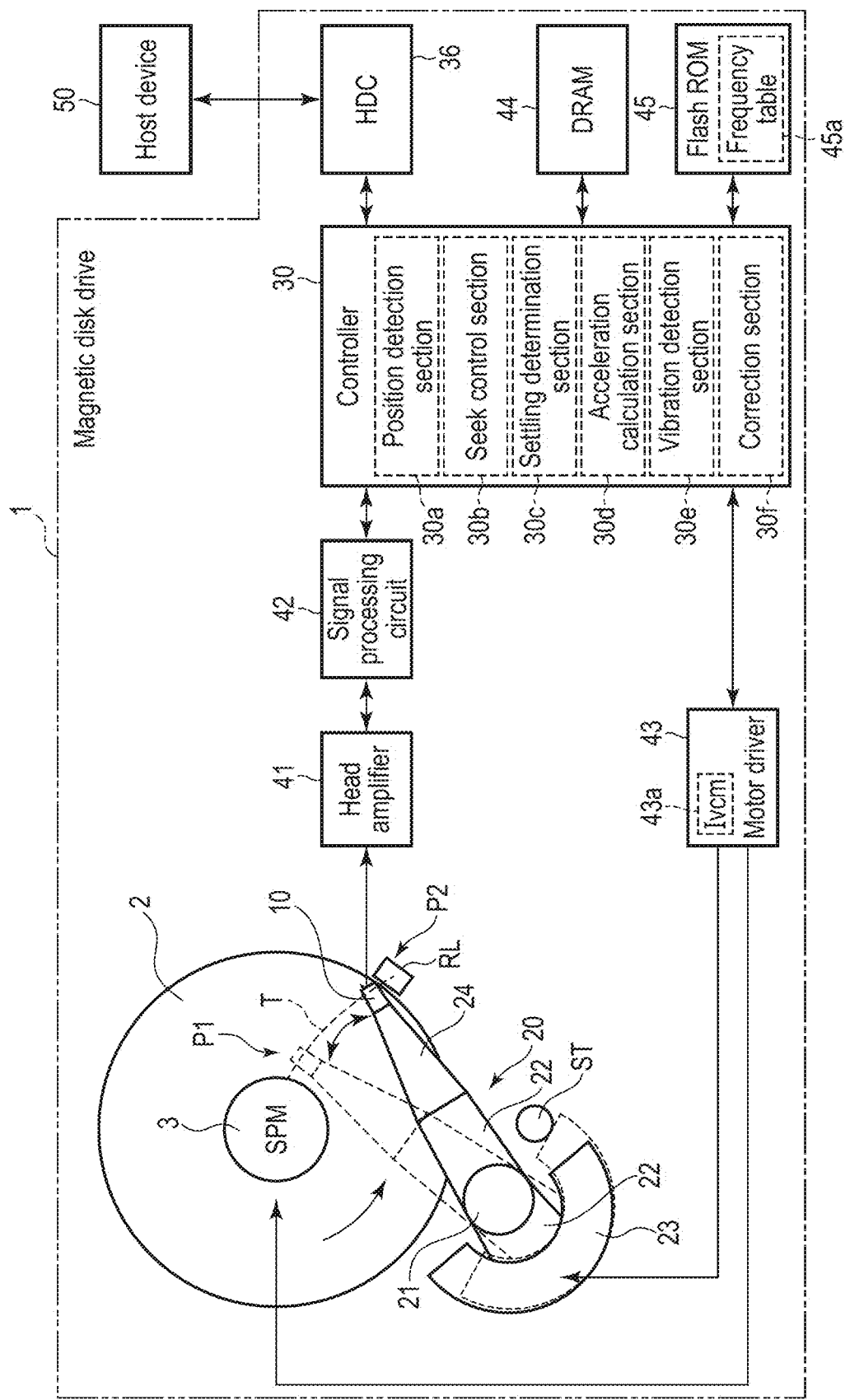
F I G. 1

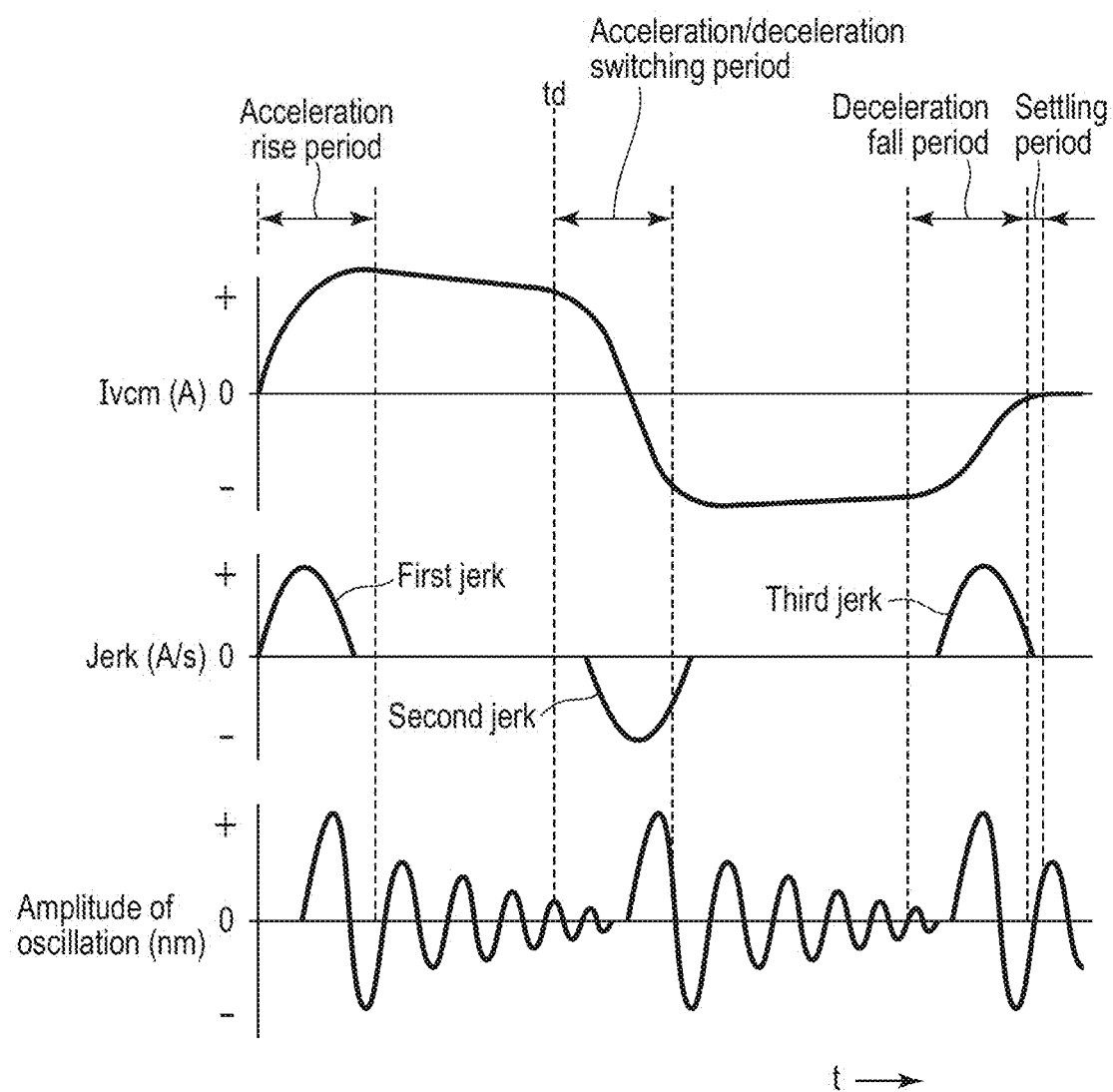
F I G. 3

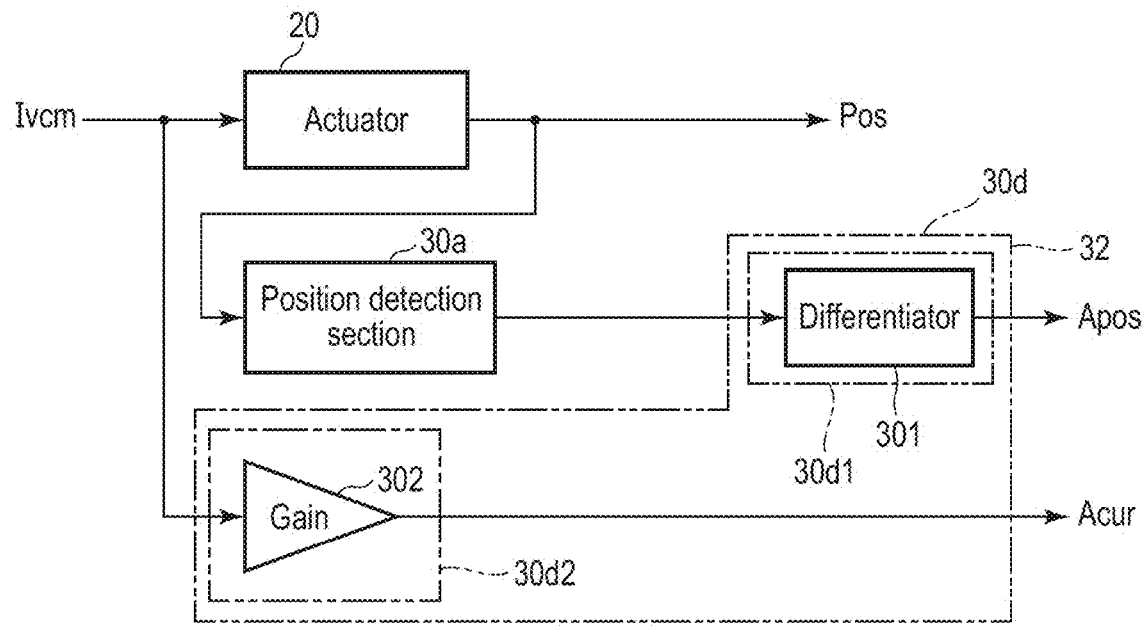
F I G. 4
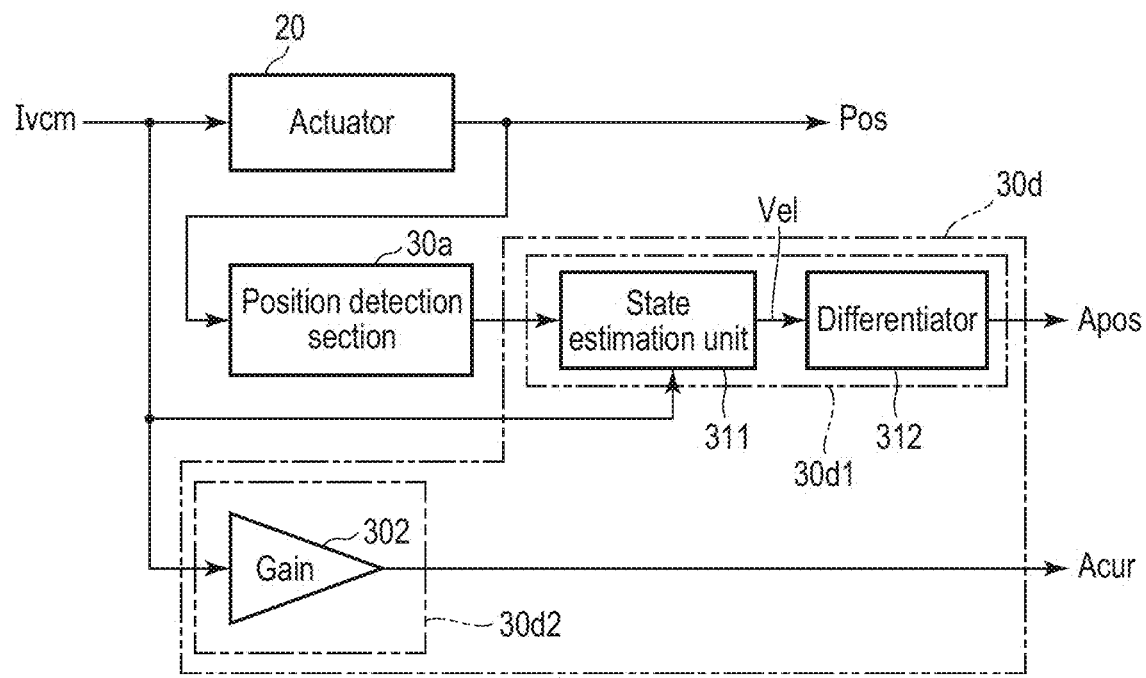
F I G. 5

| Frequency table | |
|---|---|
| Frequencies | Delay times |
| F1 | Δt1 |
| F2 | Δt2 |
| F3 | Δt3 |
| ⋮ | ⋮ |
| Fn | Δtn |

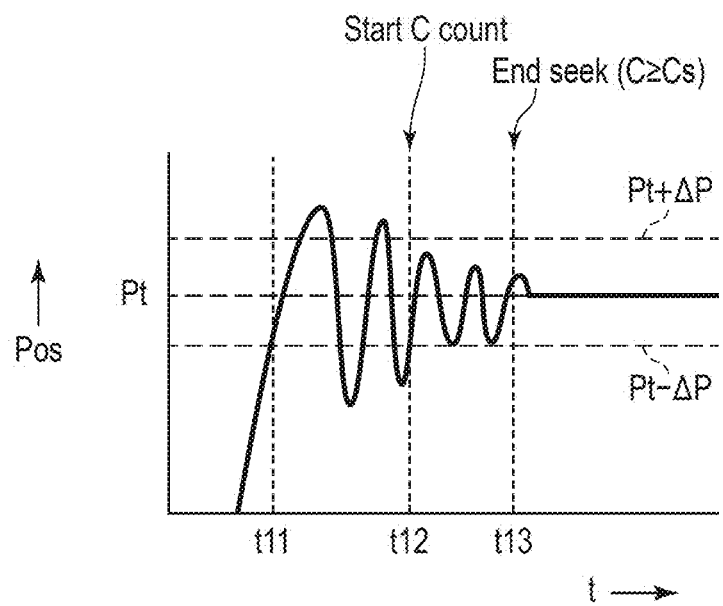
F I G. 10
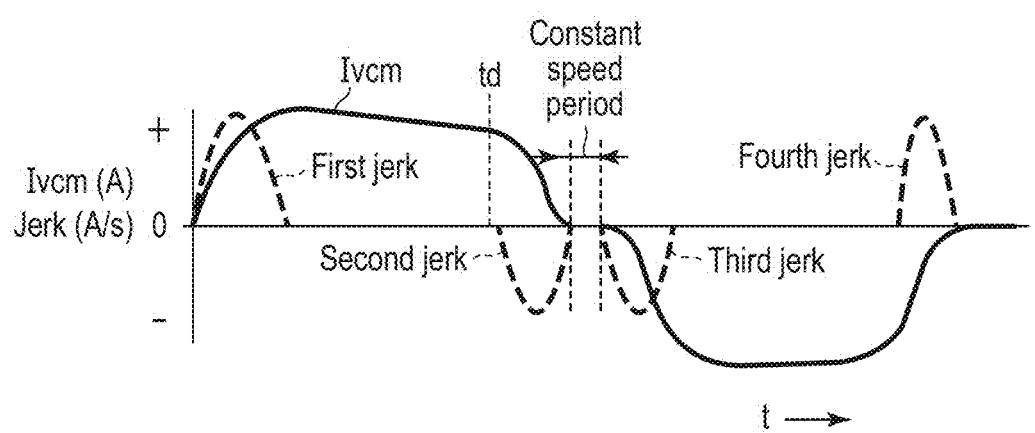
F I G. 11

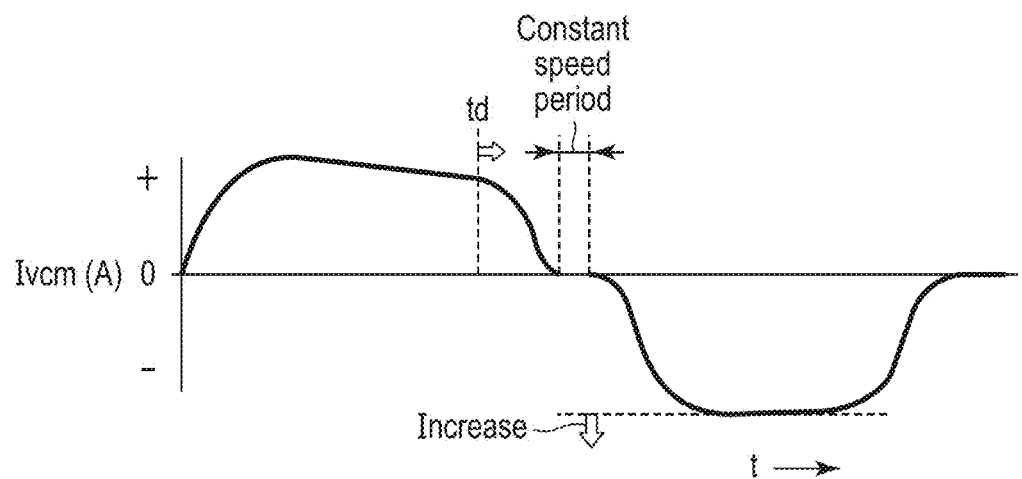
F I G. 12
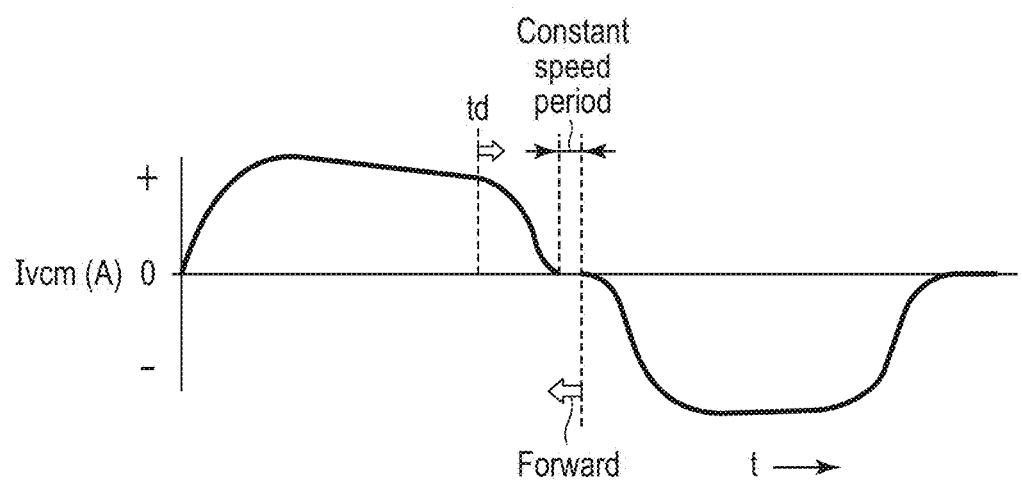
F I G. 13

MAGNETIC DISK DEVICE AND METHOD OF CONTROLLING THE SAME

CROSS-REFERENCE TO RELATED APPLICATIONS

This application is based upon and claims the benefit of priority from Japanese Patent Application No. 2024-039910, filed Mar. 14, 2024, the entire contents of which are incorporated herein by reference.

FIELD

Embodiments described herein relate generally to a magnetic disk device comprising a magnetic disk and a magnetic head, and a method of controlling the same.

BACKGROUND

A magnetic disk device comprising a magnetic disk and a magnetic head includes an actuator which holds the magnetic head so as to move in the radial direction of the magnetic disk and, when writing and reading data to and from the magnetic disk, moves the magnetic head from the current position to a target position (write position or read position) on the magnetic disk in the radial direction of the magnetic disk. Refer to this movement as seek operation.

The position of the magnetic head during the seek operation can be sequentially detected from the read data of the magnetic head for a servo pattern for positioning on the magnetic disk. When a predetermined period has elapsed in a state in which the detected position is within the specified range including the target position, the seek operation is terminated based on the determination that the magnetic head has reached the target position. Determining whether or not a certain period of time has elapsed in a state in which the above-mentioned detected position is within the specified range including the target position is referred to as settling determination.

During the seek operation, vibrations caused by various factors may occur in the actuator. It is undesirable that this vibration is transmitted to the magnetic head.

BRIEF DESCRIPTION OF THE DRAWINGS

FIG. 1 is a diagram schematically showing an overall configuration of each embodiment.

FIG. 3 is a chart showing a change in a drive current of the voice coil motor during seek operation in each embodiment, a jerk (excitation force) applied to an actuator by the change in the drive current, and an amplitude of the vibration occurring in the actuator by the jerk.

FIG. 4 is a block diagram showing a position detection section and each acceleration calculation section in each embodiment.

FIG. 5 is a block diagram showing a modified example of FIG. 4.

FIG. 8 is a table showing a format of a frequency table in each embodiment.

FIG. 10 is a chart showing a process of settling determination in each embodiment.

FIG. 11 is a chart showing a situation in which the seek operation in a second embodiment includes a constant speed period between acceleration and deceleration, along with the voice coil motor drive current and jerk.

FIG. 12 is a chart showing the control of a drive current for acceleration and a drive current for deceleration of the voice coil motor in the third embodiment.

FIG. 13 is a chart showing the control of a drive current for acceleration and a drive current for deceleration of the voice coil motor in a fourth embodiment.

DETAILED DESCRIPTION

Figure 2:
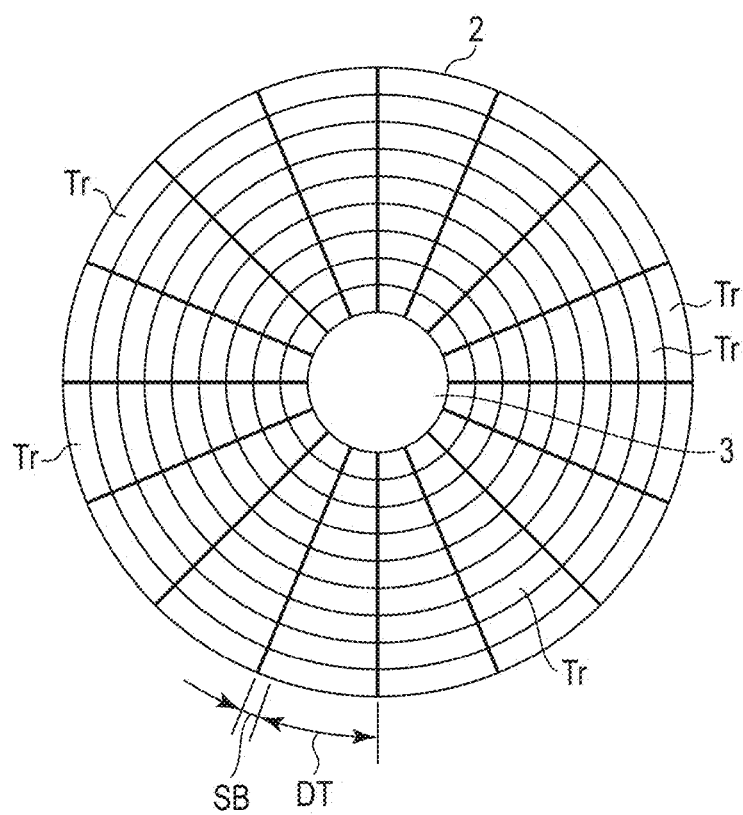
FIG. 2 is a diagram showing a configuration of main portions of the magnetic disk in each embodiment.

In general, according to one embodiment, a magnetic disk device includes a magnetic disk, a magnetic head which writes and reads data to and from the magnetic disk, an actuator which holds the magnetic head to move in a radial direction of the magnetic disk with voice coil motor drive, and a controller which controls rotation of the magnetic disk and move of the magnetic head. The controller includes a seek control section which moves the magnetic head from a current position on the magnetic disk to a target position by controlling the voice coil motor drive, an acceleration calculation section which detects an acceleration of the seek operation, based on a position history of the magnetic head, and detects an acceleration of the magnetic head, based on a value of a drive current of the voice coil motor, and an vibration detection section which detects vibration occurring in the actuator, based on a difference between the accelerations detected by the acceleration calculation section.

Embodiments will be described hereinafter with reference to the accompanying drawings. Throughout the embodiments, common elements are denoted by like reference numerals, and a detailed description thereof may be omitted unless otherwise necessary. Further, in order to make the description clearer, the widths, thicknesses, shapes, etc., of the respective parts are schematically illustrated in the drawings, compared to the actual modes. These parts can be redesigned or remodeled as needed with reference to the following descriptions and the conventional techniques.

{1} First Embodiment

A first embodiment will be described hereinafter with reference to the accompanying drawings.

As shown in FIG. 1, a magnetic disk device 1 includes a magnetic disk 2 serving as a recording medium, a spindle motor 3 that drives rotation of the magnetic disk 2, and a magnetic head 10 that writes (writes) and reads (reads) data to and from the magnetic disk 2. An actuator 20 supporting the magnetic head 10 is arranged near the magnetic disk 2.

The actuator 20 supports the magnetic head 10 in the radial direction of the magnetic disk 2 so that it can move. The actuator 20 is also referred to as an actuator block or head stack assembly (HSA), and includes a rotary shaft 21, an arm 22 with a middle part held by the rotary shaft 21, a voice coil motor (VCM) 23 provided at a proximal portion of the arm 22, a suspension member 24 provided at a distal portion of the arm 22 to hold the magnetic head 10, and the like, and rotates the magnetic head 10 from a first position represented by a dashed line in the drawing to a second position represented by a solid line in the drawing by supplying a drive current Ivcm to the voice coil motor 23. With this rotation, the magnetic head 10 moves in the radial direction of the magnetic disk 2 in a trajectory T shown in the drawing. Refer to this movement as seek operation.

A stopper ST and a ramp mechanism RL are arranged near the actuator 20. The stopper ST limits the moving position of the magnetic head 16 on the inner circumferential side of the magnetic disk 12. The ramp mechanism RL limits the moving position of the magnetic head 16 on the outer circumferential side of the magnetic disk 12.

The magnetic disk device 1 includes a controller 30 that serves as the center of control, a head amplifier 41 that drives the magnetic head 10, a signal processing circuit 42 provided in the connection between the head amplifier 41 and the controller 30, a motor driver 43 provided in the connection between the voice coil motor 23 and the controller 30, a DRAM 44 that is a memory storing programs, and the like necessary for the control of the controller 30, a flash ROM 45 that is a memory storing various data necessary for the control of the controller 30, a hard disk controller (HDC) 46 provided in the connection among the controller 30, the hard disk controller (HDC), and an external host device 50, and the like.

The head amplifier 41 amplifies data signals for write from the signal processing circuit 42 to the magnetic head 10 and also amplifies data signals to be read by the magnetic head 10. The signal processing circuit 42 appropriately processes data signals for write from the controller 30 to the magnetic head 10 and supplies the signals to the head amplifier 41, and also appropriately processes read data signals amplified by the head amplifier 41 and supplies the signals to the controller 30. The motor driver 43 controls the drive current to the spindle motor 3 and the drive current to the voice coil motor 23 of the actuator 20 in response to instructions from the controller 30. In addition, the motor driver 43 includes a current detector 43a that detects a value of drive current Ivcm to the voice coil motor 23. The flash ROM 45 includes a frequency table 45a used in the processing of a correction section 30g to be described below, in the controller 30.

As shown in FIG. 2, the magnetic disk 2 has a circular shape fitted coaxially with the rotational axis of the spindle motor 3 and includes a number of tracks Tr arranged circumferentially and concentrically. Each track Tr includes a servo sector consisting of both a servo pattern SB where position data is recorded and a data area DT where write data is stored.

The controller 30 includes as main functions a position detection section 30a, a seek control section 30b, a settling determination section 30c, an acceleration calculation section (first and second acceleration calculation sections) 30d, an vibration detection section 30e, and a correction section 30f.

[Position Detection Section 30a]

The position detection section 30a detects position Pos of the magnetic head 10 on the magnetic disk 2, based on the position data of a servo pattern SB included in the read data of the magnetic head 10.

[Seek Control Section 30b]

The seek control section 30b moves the magnetic head 10 from a current position on the magnetic disk 2 to target position Pt by controlling the drive (drive current Ivcm) of the voice coil motor 23 of the actuator 20. More specifically, the seek control section 30b moves the magnetic head 10 from the current position on the magnetic disk 2 to the target position Pt, including acceleration and deceleration in order, by controlling the drive (drive current Ivcm) of the voice coil motor 23 of the actuator 20, based on the detected position Pos of the position detection section 30a.

[Settling Determination Section 30c]

The settling determination section 30c executes so-called settling determination, which determines that the magnetic head 10 has reached the target position Pt when a certain period Cs has elapsed in a state in which the detected position Pos of the position detection section 30a is within a predetermined range including the target position Pt.

[Acceleration Calculation Section 30d]

The acceleration calculation section 30d detects the acceleration of seek operation of the magnetic head 10 based on a history of the detected position Pos of the position detection section 30a (i.e., a position history of the magnetic head 10), and detects the acceleration of magnetic head based on the value of the drive current Ivcm of the voice coil motor 23. The acceleration detected based on the history of the detected position Pos of the position detection section 30a is referred to as acceleration Apos. The acceleration detected based on the value of the drive current Ivcm of the voice coil motor 23 is referred to as acceleration Acur.

[Vibration Detection Section 30e]

The vibration detection section 30e detects the vibration occurring in the actuator 20, based on an absolute value of difference $\Delta Acc$ (=Apos−Acur) between both the accelerations Apos and Acur detected by the acceleration calculation section 30d. More specifically, when the difference $\Delta Acc$ between both the accelerations Apos and Acur detected by the acceleration calculation section 30d is greater than or equal to a threshold value, the vibration detection section 30e determines that the vibration caused by the rise of the drive current for acceleration (+Ivcm) of the voice coil motor 23 occurs in the actuator 20.

A mechanism of the vibration occurring in the actuator 20 will be described with reference to FIG. 3.

The seek operation of the magnetic head 10 is started and the actuator 20 accelerates (acceleration rise period) by the rise of the drive current for acceleration (+Ivcm) of the voice coil motor 23. Then, the drive current for acceleration (+Ivcm) falls and the drive current for deceleration (−Ivcm) rises, at the switching timing td between acceleration and deceleration, and the actuator 20 thereby decelerates (acceleration/deceleration switching period). After that, the drive current for deceleration (−Ivcm) falls (deceleration fall period), and the seek operation of the magnetic head 10 is terminated after the settling determination. The switching timing td between the acceleration and the deceleration corresponds to the fall timing of the drive current for acceleration (+Ivcm).

During the seek operation of the magnetic head 10, the vibration caused by the voice coil motor 23 is transmitted to the actuator 20. Since the vibration includes plural frequency components, the vibration among the resonance characteristics of the actuator 20 is excited at a frequency that is particularly highly sensitive. The magnitude of the exciting force caused by the voice coil motor 23 is expressed by so-called jerk ($[m/s^3]$, $[A/s]$). This jerk is particularly large at a part where the change in the drive current Ivcm of the voice coil motor 23 is large. More specifically, the jerk is particularly large at the rise timing of the drive current for acceleration (+Ivcm), the fall timing td of the drive current for acceleration (+Ivcm), the rise timing of the drive current for deceleration (−Ivcm), and the fall timing of the drive current for deceleration (−Ivcm). Incidentally, since the drive current Ivcm and the acceleration of the magnetic head are in the same dimension, the large or small rate of change in the drive current Ivcm can also be rephrased to the large or small rate of change in the acceleration of the magnetic head.

The amplitude of vibration shown in FIG. 3 converges early, but may be prolonged. If the convergence is prolonged, the vibration which remains unconverged may overlap with the vibration that next occurs and become larger.

The vibration occurring in the actuator 20 appears as a positioning error of the magnetic head 10. If the vibration occurring in the actuator 20 is so large that the vibration does not converge until the settling determination period and if the vibration continues such that the positioning error exceeds a predetermined range Pt±ΔP, the settling determination is not completed and a next read/write operation cannot be started. In this case, since the settling determination period passes through the target sector which is the read/write target, it is necessary to wait for rotation until the period reaches the target sector again, which may cause the degradation in performance.

As shown in FIG. 4, the input to the actuator 20 is the drive current Ivcm of the voice coil motor 23, and the output of the actuator 20 can be considered to be the position Pos of the magnetic head 10. If the actuator 20 is a rigid body, the acceleration at the distal end of the magnetic head 10 may be simply proportional to the drive current Ivcm (since they are in the same dimension as described above). However, since the actuator 20 has the resonance characteristics, the vibration caused by the resonance is included in the position Pos of the magnetic head 10.

[Specific Example of Acceleration Calculation Section 30d]

More specifically, as shown in FIG. 4, the acceleration calculation section 30d includes a first acceleration calculation section 30d1 that detects the acceleration Apos of the magnetic head by executing a second-order differential operation on the detected position Pos of the position detection section 30a, and a second acceleration calculation section 30d2 composed of an arithmetic unit 302 that detects the acceleration Acur of the magnetic head by multiplying the value of the drive current Ivcm of the voice coil motor 23 by a predetermined scale factor Gain.

The detected acceleration Apos of the first acceleration calculation section 30d1, which uses the detected position Pos of the position detection section 30a as an input, includes the vibration component occurring in the actuator 20 (i.e., the vibration component transmitted to the magnetic head 10). The detected acceleration Acur of the second acceleration calculation section 30d2, which uses only the value of the drive current Ivcm of the voice coil motor 23 as an input, does not include the vibration component occurring in the actuator 20.

Figure 6:
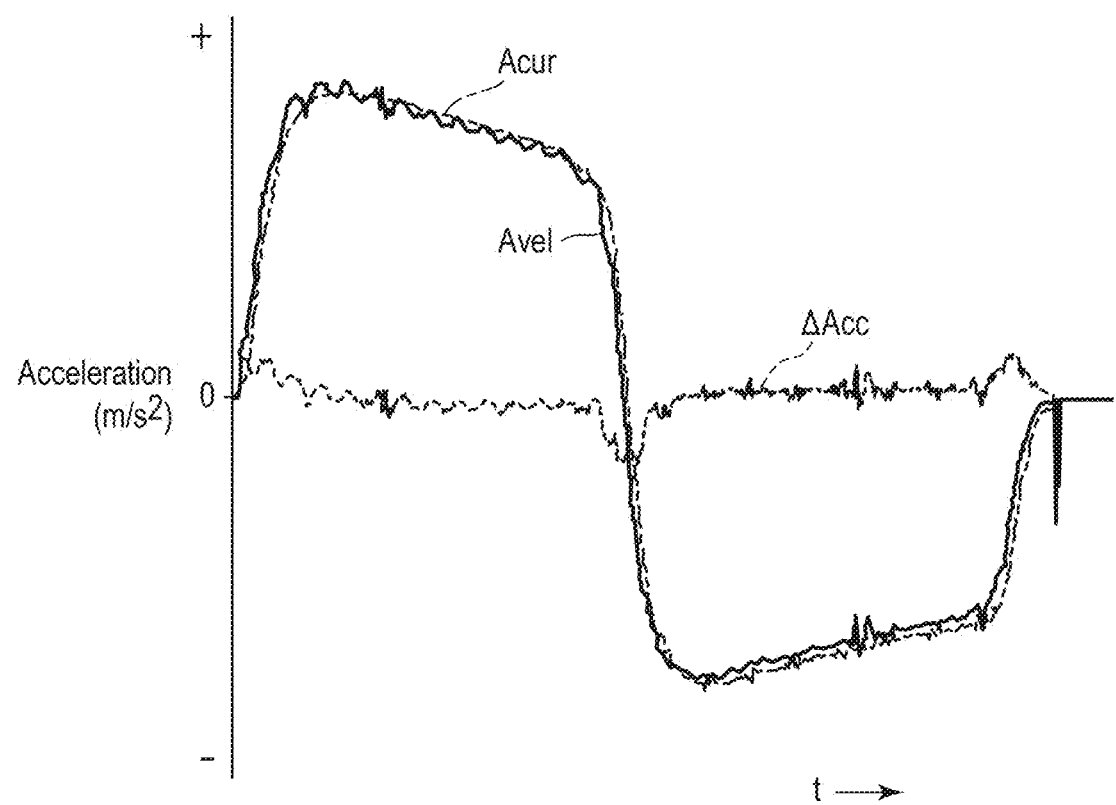
FIG. 6 is a chart showing both accelerations detected in the acceleration calculation sections of FIG. 4 and FIG. 5 and their differences.

Examples of both the detected accelerations Apos and Acur and their difference ΔAcc (=Apos−Acur) are shown in FIG. 6.

Incidentally, a configuration shown in FIG. 5 for the acceleration calculation section 30d may be adopted instead of the configuration shown in FIG. 4. The acceleration calculation section 30d in FIG. 5 includes a first acceleration calculation section 30d1 composed of both a state estimator 311 that estimates velocity Vel of the magnetic head based on the detected position Pos of the position detection section 30a and the value of the drive current Ivcm of the voice coil motor 23 and a differentiator 312 that detects the acceleration Apos of the magnetic head by executing a first-order differential operation of estimated speed Vel of the state estimator 311 at the sampling time ts, and a second acceleration calculation section 30d2 composed of an arithmetic unit 302 that detects the acceleration Acur of the magnetic head by multiplying the value of the drive current Ivcm of the voice coil motor 23 by a predetermined scale factor Gain.

The state estimator 311, also referred to as an observer, is a known instrument capable of estimating the speed of the magnetic head 10 in future samples by inputting the values of the detected position Pos of the position detection section 30a and the drive current Ivcm of the voice coil motor 23.

The detected acceleration Apos of the first acceleration calculation section 30d1, which includes the detected position Pos of the position detection section 30a as an input, includes a vibration component occurring in the actuator 20 (i.e., a vibration component transmitted to the magnetic head 10). The detected acceleration Acur of the second acceleration calculation section 30d2, which uses only the value of the drive current Ivcm of the voice coil motor 23 as an input, does not include the vibration component occurring in the actuator 20.

The acceleration Apos is obtained by the following equation (1) since the estimated velocity Vel needs only to be subjected to the first-order differentiation at the sampling time ts.

$$Apos = dVel/dts \left[ \text{Track}/ts^2 \right] \quad (1)$$

The scale factor Gain to obtain the acceleration Acur from the drive current Ivcm is expressed by the following equation (2).

$$Ggain = (BL \times ts \times ts)/(Tp \times m) \quad (2)$$

BL is the BL constant of the voice coil motor 23 (i.e., a coefficient resulting from the magnetic flux density of the magnet and the effective length of the wire located in the magnetic field) [N/A]. TP is Track Pitch [meter/Track]. m is the weight of the actuator 20 [kgf].

Therefore, the acceleration Acur can be obtained by the following equation (3).

$$Acur = Ivcm \times \text{Gain} \quad (3)$$

In other words, the vibration occurring in the actuator 20 can be detected based on the absolute value of the difference ΔAcc (=Apos−Acur) between the accelerations Apos and Acur. ΔAcc is almost zero if there is no vibration, and the magnitude of the amplitude of the vibration appears in the difference ΔAcc if the vibration occurs. The vibration can be detected by assuming that the vibration occurs if ΔAcc is greater than or equal to predetermined threshold value Thacc.

[Correction Section 30f]

If it is determined by the vibration detection section 30e that the vibration which results from the rise of the drive current for acceleration (+Ivcm) of the voice coil motor 23 occurs, the correction section 30f estimates the frequency and phase of the vibration, predicts the frequency and phase of the vibration which may occur in the actuator 20 due to the fall of the drive current for acceleration (+Ivcm) of the voice coil motor 23, and corrects the fall timing td of the drive current for acceleration (+Ivcm) of the voice coil motor 23 in a delay direction in a situation where the estimated frequency and phase of the vibration match the predicted frequency and phase of the vibration.

In accordance with this correction, the correction section 30f decreases (pulls down) a large value of the drive current for acceleration (+Ivcm) in a period before reaching the fall timing td or increases (pulls up) a large value of the drive current for deceleration (−Ivcm) after reaching the fall timing td, by the amount of the delay (correction amount) of the fall timing td of the drive current for acceleration (+Ivcm), such that the distance of the seek operation is equal before and after the correction, i.e., to avoid extension of the distance of the seek operation caused by correcting the fall timing td of the drive current for acceleration (+Ivcm) in the delayed direction.

As regards this correction section 30f, the techniques disclosed in U.S. Pat. No. 10,553,248 B (JP 2019-40657 A) and U.S. Pat. No. 10,217,485 B (JP 2020-47333 A) are known as examples of the means for estimating the frequency and phase of the vibration caused by the rise of the drive current for acceleration (+Ivcm) of the voice coil motor 23.

In the present embodiment, the frequency and phase of the vibration caused by the rise of the drive current for acceleration (+Ivcm) of the voice coil motor 23 are estimated, and at least one or more timing (time) when the vibration is assumed to continue and the phase of the vibration becomes a predetermined value is obtained as first time ta. The predetermined value is, for example, the phase at which the amplitude of the vibration becomes a maximum value or the phase at which the amplitude of the vibration becomes a minimum value.

Next, the frequency and phase of the vibration that may occur in the actuator 20 due to the fall of the drive current (+Ivcm) for acceleration of the voice coil motor 23 (during switching the acceleration/deceleration) are predicted, and at least one or more timing (time) when the phase of the vibration becomes the predetermined value is obtained as second time tb.

Figure 7:
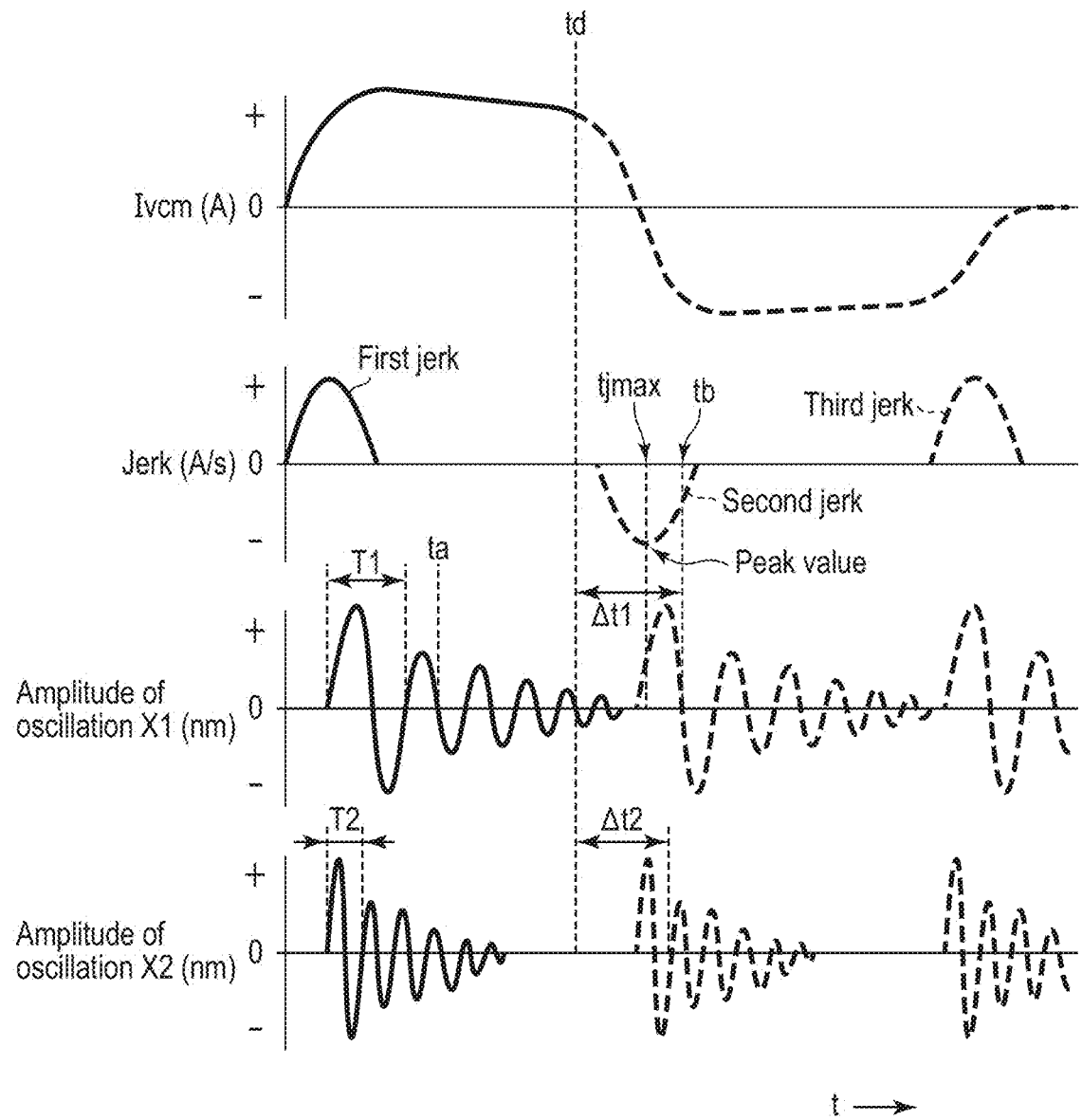
FIG. 7 is a chart showing frequencies and phases of plural vibrations occurring in the actuator in each embodiment, along with the voice coil motor drive current and jerk.

Examples of the frequency (1/T1 and 1/T2) and phase of each of plural vibrations X1 and X2 occurring in the actuator 20 are shown in FIG. 7 together with the drive current Ivcm and jerk. T1 and T2 are the periods.

It is assumed that the fall timing td of the drive current for acceleration (+Ivcm) has correlation with timing tjmax of a peak value of the jerk which may occur due to the fall of the drive current for acceleration (+Ivcm) and with timing tb when the amplitude of the vibration which may occur due to the fall of the drive current for acceleration (+Ivcm) becomes a predetermined value (zero). The timing td and the timing tb is determined at a unique value (referred to as a delay time) At for each frequency F of the vibration.

Since the fall timing td of the drive current for acceleration (+Ivcm) can be recognized from the control of the controller 30, a number of frequencies F1, F2 . . . Fn of the vibration and delay times Δt1, Δt2 . . . Δtn determined for the respective frequencies are associated with each other in advance in the frequency table 45a shown in FIG. 8, and the frequency table 45a is stored in the flash ROM 45. Then, the delay time corresponding to the frequency of the vibration which may occur due to the fall of the drive current for acceleration (+Ivcm) is searched in the frequency table 45a and read from the same frequency table 45a, and the read delay time is added to the fall timing td of the drive current for acceleration (+Ivcm), and the timing tb when the amplitude of the vibration which may occur due to the fall of the drive current for acceleration (+Ivcm) reaches a predetermined value (zero) can be thereby predicted.

For example, if the frequency of the vibration which may occur due to the fall of the drive current for acceleration (+Ivcm) is F2, the delay time Δt2 corresponding to the frequency F2 is read from the frequency table 45a by referring to the frequency table 45a, the read delay time Δt2 is added to the fall timing td of the drive current for acceleration (+Ivcm), and the timing tb (=td+Δt2) when the amplitude of the vibration which may occur due to the fall of the drive current for acceleration (+Ivcm) becomes a predetermined value (zero) is thereby predicted. If the frequency of the vibration which may occur due to the fall of the drive current for acceleration (+Ivcm) is, for example, F3, the delay time Δt3 corresponding to the frequency F3 is read from the frequency table 45a by referring to the frequency table 45a, the read delay time Δt3 is added to the fall timing td of the drive current for acceleration (+Ivcm), and the timing tb (=td+Δt3) when the amplitude of the vibration which may occur due to the fall of the drive current for acceleration (+Ivcm) becomes a predetermined value (zero) is thereby predicted.

The frequency F of the vibration which is caused to occur varies depending on the excitation conditions. For example, since the magnitude of the drive current Ivcm applied to the voice coil motor 23 changes depending on the distance of seek operation, the resonance frequency excited by the suspension 24 of the actuator 20 changes. As a result, a number of frequencies F of the vibration are considered to remain. For this reason, as many frequencies F1, F2 . . . Fn as possible and the delay times Δt1, Δt2 . . . Δtn corresponding to the respective frequencies F1, F2 . . . Fn are stored in advance in the frequency table 45a.

If the frequencies of the vibration which may occur due to the fall timing of the drive current for acceleration (+Ivcm) exist between any two of the frequencies F1, F2 . . . Fn in the frequency table 45a, the two delay times corresponding to the two frequencies respectively are read from the frequency table 45a, and the delay time located between the two read delay times is obtained by calculation. For example, if the frequency of the vibration which may occur due to the fall of the drive current for acceleration (+Ivcm) is "F1+fx" that exists between the frequencies F1 and F2 (F1<"F1+fx"<F2), the delay times Δt1 and Δt2 corresponding to the frequencies F1 and F2 are read from the frequency table 45a, and the delay time "Δt1+tx" located between the read delay times Δt1 and Δt2 is thereby obtained by calculation (Δt1<"Δt1+tx"<Δt2). Similarly, if the frequency of the vibration which may occur due to the fall of the drive current for acceleration (+Ivcm) is "F2+fy" that exists between the frequencies F2 and F3 (F2<"F2+fy"<F3), the delay times Δt2 and Δt3 corresponding to the frequencies F2 and F3 are read from the frequency table 45a, and "Δt2+ty" located between the read delay times Δt2 and Δt3 is thereby obtained as the delay time by calculation (Δt2<"Δt2+ty"<Δt3).

[Overall Control of Controller 30]

Figure 9:
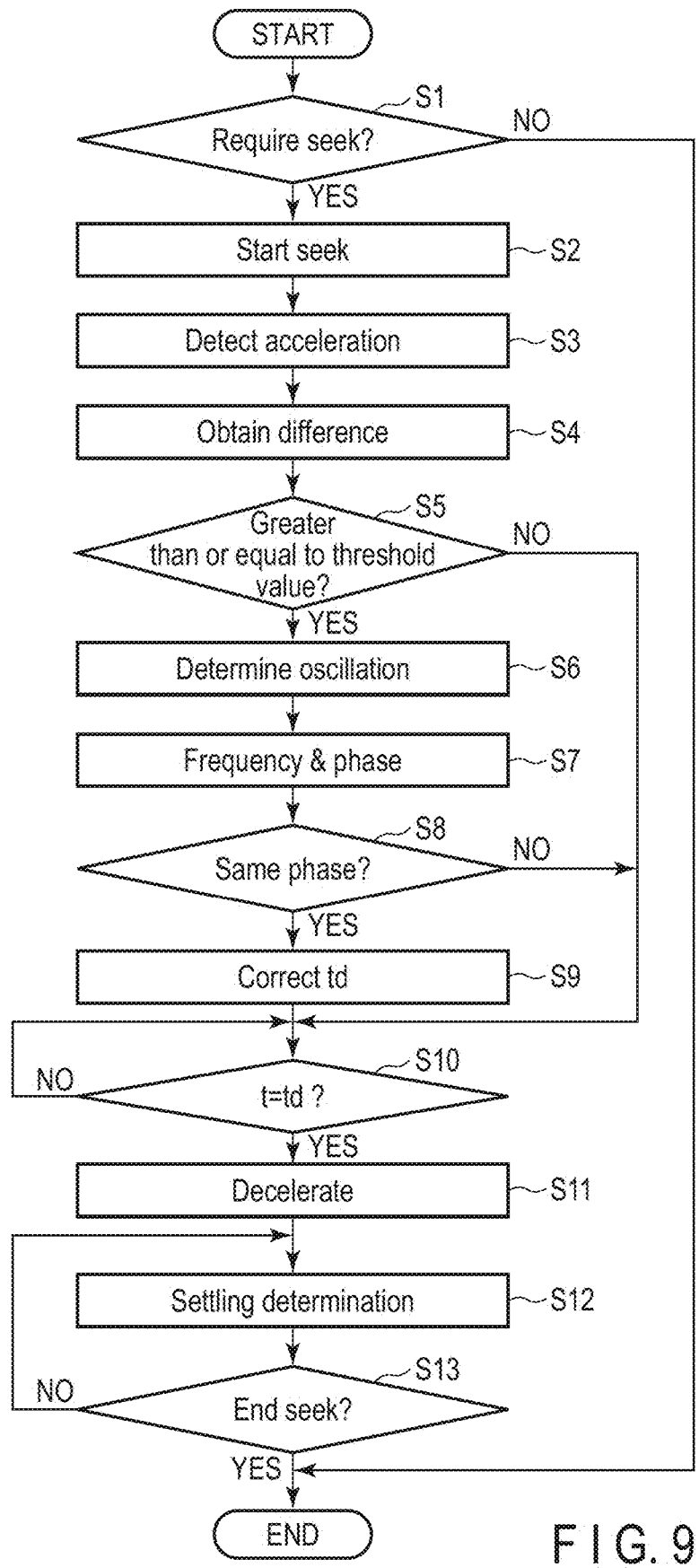
FIG. 9 is a flowchart showing the control of a first embodiment.

The overall control of the controller 30 will be described with reference to a flowchart in FIG. 9.

When the seek operation of the magnetic head 10 is required (S1), the controller 30 starts seek operation of moving the magnetic head 10 from the current position on the magnetic disk 2 to the target position Pt (S2). In accordance with the start of this seek operation, the controller 30 detects the acceleration Apos based on the history of the detected position Pos of the position detection section 30a and detects the acceleration Acur based on the value of the drive current Ivcm of the voice coil motor 23 (S3). Then, the controller 30 obtains the difference ΔAcc (=Apos−Acur) between the detected accelerations Apos and Acur (S4) and determines whether or not the absolute value of the difference ΔAcc is greater than or equal to the threshold value $Th_{Acc}$ (S5). If the absolute value of the difference ΔAcc is greater than or equal to the threshold value $Th_{Acc}$ (YES in S5), the controller 30 determines that the vibration which is caused by the rise of the drive current for acceleration (+Ivcm) of the voice coil motor 23 occurs in the actuator 20 (S6).

In accordance with this determination, the controller 30 estimates the frequency and phase of the vibration which occurs in the actuator 20, and predicts the frequency and phase of the vibration which may occur in the actuator 20 due to the fall of the drive current for acceleration (+Ivcm) of the voice coil motor 23 (S7). Subsequently, the controller 30 determines whether or not the estimated frequency and phase of the vibration match (are in the same phase as) the predicted frequency and phase of the vibration (S8).

In this determination, the controller 30 defines the timing (time) when the estimated vibration is assumed to continue and the phase of the vibration becomes a predetermined value, as the first time ta, defines the timing (time) when the phase of the predicted vibration which may occur in the future becomes the predetermined value, as the second time tb, defines the period which is the reciprocal of the frequency of the predicted vibration as Thphs, and determines that the frequencies are in the same phase if the defined parameters satisfy the following inequality. In the inequality, % represents modulo operation.

$$(|ta-tb|\% \, T) < Thphs$$

If the determination result indicates that the frequency and phase match (YES in S8), i.e., if the estimated vibration overlaps with the predicted vibration without converging and the phases of both the vibrations are the same, the controller 30 corrects the fall timing td of the drive current for acceleration (+Ivcm) that is to come in near future, in a delaying direction, based on the determination that the vibration remaining unconverged may overlap with vibration which is to occur next and become large (S9). In this case, the controller 30 corrects the fall timing td of the drive current for acceleration (+Ivcm) in the delaying direction such that the parameter satisfies the following inequality.

$$(|ta-tb|\% \, T) > Thphs$$

Subsequently with this correction, the controller 30 waits for the elapsed time t to reach the fall timing td (S10). If the elapsed time t reaches the timing td (YES in S10), the controller 30 executes deceleration of the seek operation by the fall of the drive current for acceleration (+Ivcm) (S11) and shifts to the settling determination (S12).

During the period until the elapsed time t reaches the fall timing td (NO in S10), the controller 30 decreases (pulls down) the maximum value of the drive current for acceleration (+Ivcm) by the amount (correction amount) by which the fall timing td of the drive current for acceleration (+Ivcm) is delayed, in order to avoid extension of the distance of the seek operation by correcting the fall timing td of the drive current for acceleration (+Ivcm) in the delay direction.

Alternatively, after the elapsed time t has reached the fall timing td (YES in S10), the controller 30 increases (pulls up) the maximum value of the drive current for deceleration (−Ivcm) by the amount (correction amount) by which the fall timing td of the drive current for acceleration (+Ivcm) is delayed, in order to avoid extension of the distance of the seek operation by correcting the fall timing td of the drive current for acceleration (+Ivcm) in the delay direction.

In the settling determination, as shown in FIG. 10, the controller 30 starts counting the elapse of time or the number of sectors in which the time elapses by the counter, at timing t12 at which the detected position Pos of the position detection section 30a is completely within the specified range (i.e., a range of "Pt+ΔP" to "Pt−ΔP") including the target position Pt and, when the count value C reaches a certain period (settling period) Cs (timing t13), determines that the magnetic head 10 has reached the target position Pt. The controller 30 considers this determination result as the end of seek operation (YES in S13) and terminates the seek operation.

As described above, the vibrations occurring in the actuator 20 can be detected accurately. Furthermore, even if the vibration previously occurring does not converge and remains and overlaps with the subsequent vibration, the state in which the amplitude of the remaining vibration becomes large to an unnecessary level can be avoided. As a result, even if the remaining vibration extends to the settling determination period, an appropriate settling determination can be executed. A measure to extend the constant period Cs of the settling determination due to the remaining vibration also become unnecessary. The constant period Cs can also be shortened. Moreover, the end timing of the seek operation can be accelerated as much as possible, and the processing speed of data read and write can be accelerated accordingly. Since the amplitude of the remaining vibration is not unnecessarily large, the positioning accuracy of the magnetic head 10 is improved and the reliability of data read and write from and to the magnetic disk 2 is also improved.

{2} Second Embodiment

A second embodiment will be described.

As shown in FIG. 3, the magnitude of the remaining vibration is influenced by the magnitude of a first jerk occurring due to the rise of a drive current for acceleration (+Ivcm), the magnitude of a second jerk occurring at the fall of the drive current for acceleration (+Ivcm) (at switching of acceleration and deceleration), the magnitude of a third jerk occurring at the fall of the drive current for deceleration (−Ivcm), and the timing of occurrence of these jerks. For example, when the phases of plural vibrations excited by the respective first, second, and third jerks are aligned, the amplitude of the remaining vibration becomes large.

In consideration of this point, the second embodiment is different from the first embodiment in a function of a seek control section 30b of a controller 30.

In other words, the seek control section 30b moves the magnetic head 10 from the current position on the magnetic disk 2 to the target position Pt, including acceleration, a constant speed, and deceleration in order, by controlling the drive (drive current Ivcm) of the voice coil motor 23 of the actuator 20, based on the detected position Pos of the position detection section 30a, as shown in FIG. 11.

The third jerk can be arranged at any timing by inserting a constant speed period between the acceleration and the deceleration in the correction section 30f of the controller 30. By setting the constant speed period such that the phase of the vibration occurring at the third jerk is not the same as the phase of the vibration occurring at the first and second jerks, the amplitude of the remaining vibration can be suppressed. It is assumed that the phase of the vibration occurring at the first jerk is the same as the phase of the vibration occurring at the second jerk.

Means for preventing the phases of two or more vibrations from being the same when a constant speed period is inserted between the acceleration and the deceleration will be described. When it is assumed that the vibration is sinusoidal, there is a correlation among the timing when the drive current Ivcm starts changing, the timing when the jerk becomes a maximum value, and the timing when the phase of the vibration excited by the jerk becomes 0 [rad].

If the timing when the estimated phase of the vibration becomes a predetermined value is set as first time (ta), the timing when the predicted phase of the vibration becomes the same predetermined value is set as second time (tb), and a period which is a reciprocal of the predicted frequency of the vibration is T, phase difference φ [rad] between the two vibrations is expressed by the following equation.

$$\phi = [(tb-ta)/T] \times 2\pi \quad (4)$$

As described above, the amplitude of the remaining vibration becomes maximum when the phases of the two vibrations are aligned (i.e., become the inphase), i.e., at the timing when [(tb–ta)/T] in the above equation (4) becomes an integral multiple. Therefore, if the second time tb, i.e., the timing when the vibration occurring due to the fall of the acceleration drive current (+Ivcm) has a predetermined phase, satisfies the conditions of the following inequality, and even if the estimated vibration remains, it is possible to avoid a situation where the remaining amplitude becomes a maximum value. Thphs is a threshold value for determining the same phases.

$$[(tb-ta)\% T] > Thphs$$

The correction section 30f needs to insert a constant speed period such that the distances of the seek operation before and after the correction are equal. The constant speed period is secured by correcting the fall timing td of the drive current for acceleration (+Ivcm) in an advance direction, and the maximum value of the drive current for deceleration (−Ivcm) is decreased to avoid reduction in the distance of the seek operation (in this case, the rise timing of the drive current for deceleration (−Ivcm) is not changed). Alternatively, the constant speed period is secured by correcting the rise timing of the drive current for deceleration (−Ivcm) in a delay direction, and the maximum value of the drive current for deceleration (−Ivcm) is increased to avoid extension in the distance of the seek operation (in this case, the fall timing of the drive current for acceleration (+Ivcm) is not changed).

The other constituent elements and advantages are the same as those of the first embodiment.

{3} Third Embodiment

A third embodiment will be described. A seek control section 30b of a controller 30 moves a magnetic head 10 from a current position on a magnetic disk 2 to a target position Pt, including acceleration, constant speed, and deceleration in order, as shown in FIG. 11.

Then, if it is determined by the vibration detection section 30e that the vibration which results from the rise of the drive current for acceleration (+Ivcm) of the voice coil motor 23 occurs, the correction section 30f of the controller 30 estimates the frequency and phase of the vibration, predicts the frequency and phase of the vibration which may occur in the actuator 20 due to the fall of the drive current for acceleration (+Ivcm) of the voice coil motor 23, and corrects the fall timing td of the drive current for acceleration (+Ivcm) of the voice coil motor 23 in a delay direction in a situation where the estimated frequency and phase of the vibration match the predicted frequency and phase of the vibration, as shown in FIG. 12.

In accordance with this correction, the correction section 30f increases the maximum value of the drive current for deceleration (−Ivcm) by the amount (correction amount) by which the fall timing td of the drive current for acceleration (+Ivcm) is delayed, in order to make the distance of the seek operation before and after the correction equal, i.e., to avoid extension of the distance of the seek operation by correcting the fall timing td of the drive current for acceleration (+Ivcm) in the delay direction. The other constituent elements and advantages are the same as those of the first embodiment.

{4} Fourth Embodiment

A fourth embodiment will be described.

A seek control section 30b of a controller 30 moves a magnetic head 10 from a current position on a magnetic disk 2 to a target position Pt, including acceleration, constant speed, and deceleration in order, as shown in FIG. 11.

Then, if it is determined by the vibration detection section 30e that the vibration which results from the rise of the drive current for acceleration (+Ivcm) of the voice coil motor 23 occurs, the correction section 30f estimates the frequency and phase of the vibration, predicts the frequency and phase of the vibration which may occur in the actuator 20 due to the fall of the drive current for acceleration (+Ivcm) of the voice coil motor 23, corrects the fall timing td of the drive current for acceleration (+Ivcm) of the voice coil motor 23 in a delay direction, and corrects the rise timing of the drive current for deceleration (−Ivcm) of the voice coil motor 23 in an advance direction, in a situation where the estimated frequency and phase of the vibration match the predicted frequency and phase of the vibration, as shown in FIG. 13.

The increase in speed caused by correcting the fall timing of the drive current for acceleration (+Ivcm) in the delay direction can be compensated by correcting the rise timing of the drive current for deceleration (−Ivcm) in the advance direction.

The other constituent elements and advantages are the same as those of the first embodiment.

{5} Fifth Embodiment

A fifth embodiment will be described. A seek control section 30b of a controller 30 moves a magnetic head 10 from a current position on a magnetic disk 2 to a target position Pt, including acceleration, constant speed, and deceleration in order, as shown in FIG. 11.

Figure 14:
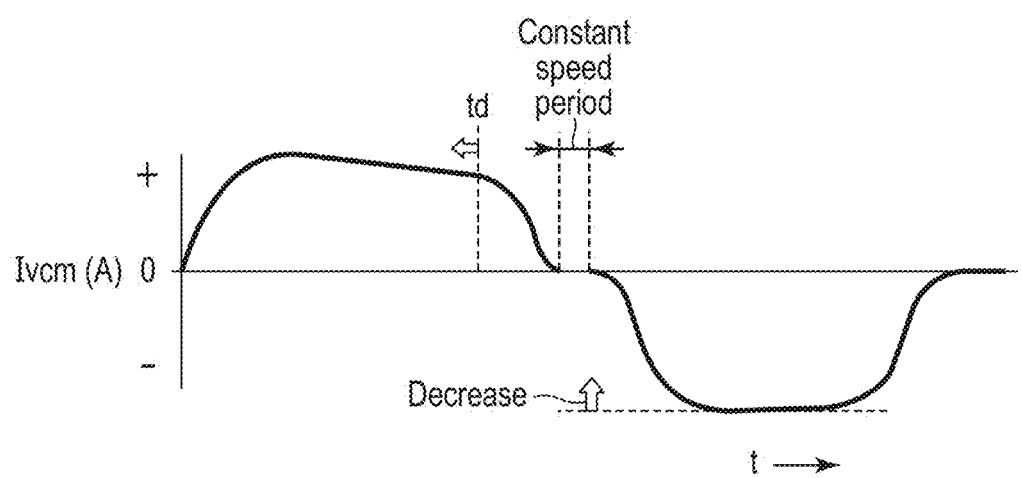
FIG. 14 is a chart showing the control of a drive current for acceleration and a drive current for deceleration of the voice coil motor in a fifth embodiment.

Then, if it is determined by the vibration detection section 30e that the vibration which results from the rise of the drive current for acceleration (+Ivcm) of the voice coil motor 23 occurs, the correction section 30*f* of the controller 30 estimates the frequency and phase of the vibration, predicts the frequency and phase of the vibration which may occur in the actuator 20 due to the fall of the drive current for acceleration (+Ivcm) of the voice coil motor 23, and corrects the fall timing td of the drive current for acceleration (+Ivcm) of the voice coil motor 23 in an advance direction, in a situation where the estimated frequency and phase of the vibration match the predicted frequency and phase of the vibration, as shown in FIG. 14.

In accordance with this correction, the correction section 30*f* decreases (pulls down) the maximum value of the drive current for deceleration (−Ivcm) by the amount (correction amount) by which the fall timing td of the drive current for acceleration (+Ivcm) is made to advance, in order to make the distance of the seek operation before and after the correction equal, i.e., to avoid reduction in the distance of the seek operation by correcting the fall timing td of the drive current for acceleration (+Ivcm) in the advance direction. The other constituent elements and advantages are the same as those of the first embodiment.

{6} Sixth Embodiment

A sixth embodiment will be described.

If it is determined by the vibration detection section 30*e* that the vibration which results from the rise of the drive current for acceleration (+Ivcm) of the voice coil motor 23 occurs, the correction section 30*f* of the controller 30 estimates the frequency and phase of the vibration, predicts the frequency and phase of the vibration which may occur in the actuator 20 due to the fall of the drive current for acceleration (+Ivcm) of the voice coil motor 23, and corrects a constant period Cs of the settling determination section 30*c* in a situation where the estimated frequency and phase of the vibration match the predicted frequency and phase of the vibration.

Figure 15:
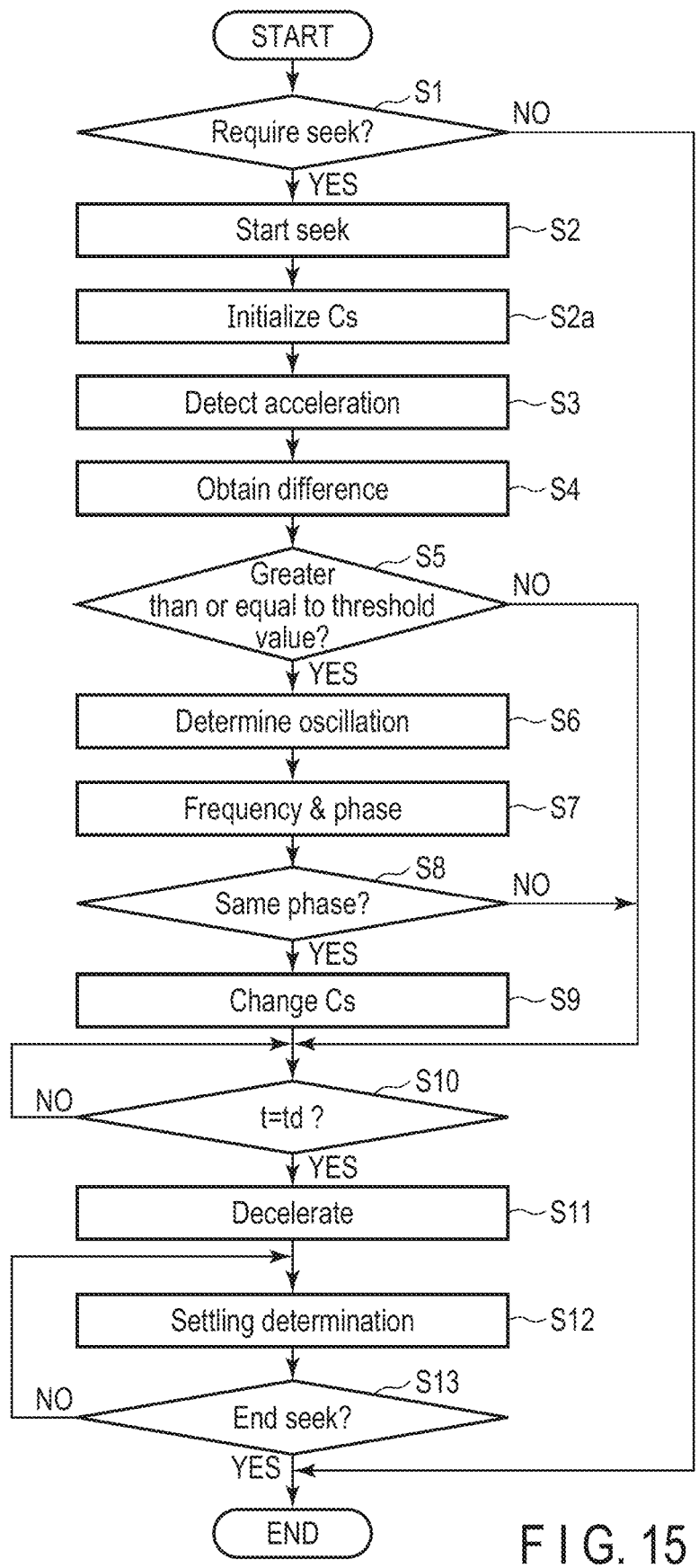
FIG. 15 is a flowchart showing the control of a sixth embodiment.

The control executed by the controller 30 is shown in the flowchart of FIG. 15.

When the seek operation of the magnetic head 10 is required (S1), the controller 30 starts seek operation of moving the magnetic head 10 from the current position on the magnetic disk 2 to the target position Pt (S2). In accordance with the start of this seek operation, controller 30 sets the constant period Cs in the settling determination section 30*c* to an initial value (S2*a*). Then, the controller 30 detects acceleration Apos and acceleration Acur (S3), calculates difference ΔAcc (=Apos−Acur) between the detected accelerations Apos and Acur (S4), and determines whether or not an absolute value of the difference ΔAcc is greater than or equal to the threshold value $Th_{Acc}$ (S5).

If the absolute value of the difference ΔAcc is greater than or equal to the threshold value $Th_{Acc}$ (YES in S5), the controller 30 determines that the vibration which is caused by the rise of the drive current for acceleration (+Ivcm) of the voice coil motor 23 occurs in the actuator 20 (S6).

In accordance with this determination, the controller 30 estimates the frequency and phase of the vibration which occurs in the actuator 20, and predicts the frequency and phase of the vibration which may occur in the actuator 20 due to the fall of the drive current for acceleration (+Ivcm) of the voice coil motor 23 (S7). Subsequently, the controller 30 determines whether or not the estimated frequency and phase of the vibration match (are in the same phase as) the predicted frequency and phase of the vibration (S8).

If the determination result indicates that the frequency and phase match (YES in S8), the controller 30 corrects the constant period Cs of the settling determination to an extension direction by a predetermined value, based on the determination that the previously occurring vibration may not converge but remain, overlap with vibration which is to occur next and become large (S9).

Subsequently with this correction, the controller 30 waits for the elapsed time t to reach timing td (S10). If the elapsed time t reaches the timing td (YES in S10), the controller 30 executes deceleration of the seek operation by the rise of the drive current for deceleration (−Ivcm) (S11) and shifts to the settling determination (S12).

In the settling determination, as shown in FIG. 10, the controller 30 starts counting the elapse of time or the number of sectors in which the time elapses by the counter, at timing t12 at which the detected position Pos of the position detection section 30*a* is completely within the specified range (i.e., a range of "Pt+ΔP" to "Pt−ΔP") including the target position Pt and, when the count value C reaches a certain period (settling period) Cs (timing t13), determines that the magnetic head 10 has reached the target position Pt. The controller 30 considers this determination result as the end of seek operation (YES in S13) and terminates the seek operation.

As described above, the vibrations occurring in the actuator 20 can be detected accurately. Furthermore, even if the previously occurring vibration does not converge but remains and overlaps with the subsequent vibration and the amplitude of the remaining vibration becomes large, and even if the remaining vibration extends to the settling determination period, the constant period Cs of the settling determination is extended, and appropriate settling determination can be thereby completed. Since the amplitude of the remaining vibration is not unnecessarily large, the positioning accuracy of the magnetic head 10 is improved and the reliability of data read and write from and to the magnetic disk 2 is also improved.

Modified Example

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head which writes and reads data to and from the magnetic disk;
   an actuator which holds the magnetic head to move in a radial direction of the magnetic disk with voice coil motor drive; and
   a controller which controls move of the magnetic head, wherein
   the controller includes:
   a seek control section which moves the magnetic head from a current position on the magnetic disk to a target position by controlling the voice coil motor drive;
   an acceleration calculation section which calculates an acceleration of the magnetic head, based on a radial direction position history of the magnetic head, and calculates an acceleration of the magnetic head, based on a value of a drive current of the voice coil motor; and an vibration detection section which detects vibration occurring in the actuator, based on a difference between the acceleration based on position history and the acceleration based on a value of a drive current of the voice coil motor detected by the acceleration calculation section.

2. The device according to claim 1, wherein
the controller further includes:
a position detection section which detects a radial direction position of the magnetic head on the magnetic disk, based on read data of the magnetic head; and
a determination section which determines that the magnetic head has reached the target position when a certain period has elapsed in a state in which the detected position of the position detection section is within a predetermined range including the target position.

3. The device according to claim 2, wherein
the acceleration calculation section includes a first acceleration calculation section which detects an acceleration of the magnetic head by executing a second-order differential operation for the detected position of the position detection section, and a second acceleration calculation section which calculates the acceleration of the magnetic head by multiplying the value of the drive current of the voice coil motor by a predetermined scale factor.

4. The device according to claim 2, wherein
the acceleration calculation section includes a first acceleration calculation section which calculates an acceleration of the magnetic head by estimating a speed of the magnetic head based on the detected position of the position detection section and the value of the drive current of the voice coil motor and by executing a first-order differential operation for the estimated speed, and a second acceleration calculation section which calculates the acceleration of the magnetic head by multiplying the value of the drive current of the voice coil motor by a predetermined scale factor.

5. The device according to claim 2, wherein
the seek control section moves the magnetic head from the current position on the magnetic disk to the target position, including acceleration and deceleration in order, by controlling the drive of the voice coil motor, based on the detected position of the position detection section, and
when a difference between the acceleration based on position history and the acceleration based on a value of a drive current of the voice coil motor calculated by the acceleration calculation section is greater than or equal to a predetermined threshold value, the vibration detection section determines that the vibration caused by rise of the drive current for acceleration of the voice coil motor occurs in the actuator.

6. The device according to claim 5, wherein
the controller further includes:
a correction section, if it is determined by the vibration detection section that the vibration caused by the rise of the drive current for acceleration of the voice coil motor occurs, which estimates frequency and phase of the vibration, predicting frequency and phase of an vibration which is to occur in the actuator due to the fall of the drive current for acceleration of the voice coil motor, and corrects fall timing of the drive current for acceleration of the voice coil motor in a situation where the estimated frequency and phase of the vibration match the predicted frequency and phase of the vibration.

7. The device according to claim 6, wherein
the correction section corrects the fall timing of the drive current for acceleration of the voice coil motor in a delay direction, in the situation where the estimated frequency and phase of the vibration match the predicted frequency and phase of the vibration.

8. The device according to claim 7, wherein
the correction section decreases a maximum value of the drive current for acceleration of the voice coil motor or increases the drive current for deceleration by an amount by which the fall timing of the drive current for acceleration of the voice coil motor is corrected in the delay direction.

9. The device according to claim 6, wherein
the correction section corrects the fall timing of the drive current for acceleration of the voice coil motor in an advance direction, in the situation where the estimated frequency and phase of the vibration match the predicted frequency and phase of the vibration.

10. The device according to claim 9, wherein
the correction section increases a maximum value of the drive current for acceleration of the voice coil motor or decreases the drive current for deceleration by an amount by which the fall timing of the drive current for acceleration of the voice coil motor is corrected in the advance direction.

11. The device according to claim 2, wherein
the seek control section moves the magnetic head from the current position on the magnetic head to the target position, including acceleration, constant speed, and deceleration in order, by controlling the drive of the voice coil motor, based on the detected position of the position detection section, and
if the difference between the acceleration based on position history and the acceleration based on a value of a drive current of the voice coil motor calculated by the acceleration calculation section is greater than or equal to a predetermined threshold value, the vibration detection section determines that the vibration caused by the rise of the drive current for acceleration of the voice coil motor occurs in the actuator.

12. The device according to claim 11, wherein
the controller further includes:
a correction section, if it is determined by the vibration detection section that the vibration caused by the rise of the drive current for acceleration of the voice coil motor occurs, which estimates frequency and phase of the vibration, predicts frequency and phase of an vibration which is to occur in the actuator due to the fall of the drive current for acceleration of the voice coil motor, and corrects fall timing of the drive current for acceleration of the voice coil motor in a delay direction, in a situation where the estimated frequency and phase of the vibration match the predicted frequency and phase of the vibration.

13. The device according to claim 12, wherein
the correction section decreases a maximum value of the drive current for acceleration of the voice coil motor or increasing a maximum value of the drive current for deceleration of the voice coil motor by a correction amount by which the fall timing of the drive current for acceleration of the voice coil motor is corrected in the delay direction.

14. The device according to claim 11, wherein the controller further includes:
a correction section, if it is determined by the vibration detection section that the vibration caused by the rise of the drive current for acceleration of the voice coil motor occurs, which estimates frequency and phase of the vibration, predicts frequency and phase of an vibration which is to occur in the actuator due to the fall of the drive current for acceleration of the voice coil motor, and corrects fall timing of the drive current for acceleration of the voice coil motor in a delay direction and corrects rise timing of a drive current for deceleration of the voice coil motor in an advance direction, in a situation where the estimated frequency and phase of the vibration match the predicted frequency and phase of the vibration.

15. The device according to claim 11, wherein the controller further includes:
a correction section, if it is determined by the vibration detection section that the vibration caused by the rise of the drive current for acceleration of the voice coil motor occurs, which estimates frequency and phase of the vibration, predicts frequency and phase of an vibration which is to occur in the actuator due to the fall of the drive current for acceleration of the voice coil motor, and corrects fall timing of the drive current for acceleration of the voice coil motor in an advance direction, in a situation where the estimated frequency and phase of the vibration match the predicted frequency and phase of the vibration.

16. The device according to claim 15, wherein the correction section increases a maximum value of the drive current for acceleration of the voice coil motor or decreases a maximum value of the drive current for deceleration of the voice coil motor by a correction amount by which the fall timing of the drive current for acceleration of the voice coil motor is corrected in the advance direction.

17. The device according to claim 11, wherein the controller further includes:
a correction section, if it is determined by the vibration detection section that the vibration caused by the rise of the drive current for acceleration of the voice coil motor occurs, which estimates frequency and phase of the vibration, predicts frequency and phase of an vibration which is to occur in the actuator due to the fall of the drive current for acceleration of the voice coil motor, and corrects fall timing of the drive current for acceleration of the voice coil motor in an advance direction and correcting rise timing of a drive current for deceleration of the voice coil motor in a delay direction, in a situation where the estimated frequency and phase of the vibration match the predicted frequency and phase of the vibration.

18. The device according to claim 2, wherein the controller further includes:
a correction section, if it is determined by the vibration detection section that the vibration caused by the rise of the drive current for acceleration of the voice coil motor occurs, which estimates frequency and phase of the vibration, predicts frequency and phase of an vibration which is to occur in the actuator due to the fall of the drive current for acceleration of the voice coil motor, and corrects the constant period of the determination section in a situation where the estimated frequency and phase of the vibration match the predicted frequency and phase of the vibration.

19. A method of controlling a magnetic disk device comprising a magnetic disk, a magnetic head writing and read data to and from the magnetic disk, an actuator holding the magnetic head to move in a radial direction of the magnetic disk with voice coil motor drive, and a controller controlling movement of the magnetic head,
the method comprising:
moving the magnetic head from a current position on the magnetic disk to a target position by controlling the voice coil motor drive;
calculating an acceleration of the magnetic head based on a position history of the magnetic head, and an acceleration of the magnetic head based on a value of a drive current of the voice coil motor; and
detecting vibration occurring in the actuator, based on a difference between the calculated acceleration based on position history and the acceleration based on a value of a drive current of the voice coil motor.

20. A magnetic disk device comprising:
a magnetic disk;
a magnetic head which writes and reads data to and from the magnetic disk;
an actuator which holds the magnetic head to move in a radial direction of the magnetic disk with voice coil motor drive; and
a controller which controls move of the magnetic head, wherein
the controller includes:
a seek control section which moves the magnetic head from a current position on the magnetic disk to a target position by controlling the voice coil motor drive;
an acceleration calculation section which calculates an acceleration of the magnetic head, based on a radial direction position history of the magnetic head, and calculates an acceleration of the magnetic head, based on a value of a drive current of the voice coil motor; and
an vibration detection section which determines that the vibration caused by rise of the drive current for acceleration of the voice coil motor occurs in the actuator when a difference between the acceleration based on position history of the magnetic head and the acceleration based on a value of a drive current of the voice coil motor calculated by the acceleration calculation section is greater than or equal to a predetermined threshold value.

* * * * *